United States Patent
Smidebrant et al.

(10) Patent No.: US 9,868,360 B2
(45) Date of Patent: Jan. 16, 2018

(54) METHOD FOR BALANCING THE VOLTAGE OF BATTERY CELLS

(71) Applicant: VOLVO TRUCK CORPORATION, Göteborg (SE)

(72) Inventors: Tobias Smidebrant, Göteborg (SE); Jerker Lennevi, Lerum (SE)

(73) Assignee: Volvo Truck Corporation, Göteborg (SE)

( * ) Notice: Subject to any disclaimer, the term of this patent is extended or adjusted under 35 U.S.C. 154(b) by 16 days.

(21) Appl. No.: 14/769,823

(22) PCT Filed: Feb. 27, 2013

(86) PCT No.: PCT/EP2013/000570
§ 371 (c)(1),
(2) Date: Aug. 24, 2015

(87) PCT Pub. No.: WO2014/131424
PCT Pub. Date: Sep. 4, 2014

(65) Prior Publication Data
US 2016/0001673 A1    Jan. 7, 2016

(51) Int. Cl.
*H02J 7/00* (2006.01)
*B60L 11/18* (2006.01)
(Continued)

(52) U.S. Cl.
CPC ........... *B60L 11/1866* (2013.01); *B60L 1/003* (2013.01); *B60L 1/006* (2013.01); *B60L 3/0046* (2013.01);
(Continued)

(58) Field of Classification Search
CPC .................................................... B60L 11/1866
(Continued)

(56) References Cited

U.S. PATENT DOCUMENTS

| | | |
|---|---|---|
| 5,828,201 A | 10/1998 | Hoffman, Jr. et al. |
| 2009/0039831 A1* | 2/2009 | Ichikawa ............ B60L 11/1816 320/118 |

(Continued)

FOREIGN PATENT DOCUMENTS

| | | |
|---|---|---|
| CN | 101162792 A | 4/2008 |
| CN | 101396975 A | 4/2009 |

(Continued)

OTHER PUBLICATIONS

Chinese Official Action (dated Aug. 22, 2016) for corresponding Chinese App. 201380073915.9.

(Continued)

*Primary Examiner* — Suresh Memula
(74) *Attorney, Agent, or Firm* — WRB-IP LLP (57) ABSTRACT

A method is provided for balancing the voltage of multiple series-connected electrochemical cells of an electrical storage system of a hybrid electric vehicle. The method includes discharging the electrical storage system by operating at least one large electrical machine of the vehicle at vehicle standstill until the state of charge of the electrical storage system or the cell having the lowest state of charge has reached a predetermined level, and subsequently balancing the voltage of the cells.

23 Claims, 4 Drawing Sheets

(51) Int. Cl.
*B60L 1/00* (2006.01)
*B60L 3/00* (2006.01)
*B60L 3/12* (2006.01)
*B60L 7/20* (2006.01)
*B60L 11/14* (2006.01)
*B60L 11/16* (2006.01)
*B60L 15/20* (2006.01)

(52) U.S. Cl.
CPC .................. *B60L 3/12* (2013.01); *B60L 7/20* (2013.01); *B60L 11/14* (2013.01); *B60L 11/16* (2013.01); *B60L 11/1803* (2013.01); *B60L 11/1861* (2013.01); *B60L 11/1862* (2013.01); *B60L 15/20* (2013.01); *B60L 15/2009* (2013.01); *H02J 7/0014* (2013.01); *H02J 7/0016* (2013.01); *B60L 2200/18* (2013.01); *B60L 2200/36* (2013.01); *B60L 2240/34* (2013.01); *B60L 2240/423* (2013.01); *B60L 2240/545* (2013.01); *B60L 2240/547* (2013.01); *B60L 2240/549* (2013.01); *B60L 2240/80* (2013.01); *B60L 2260/44* (2013.01); *Y02T 10/645* (2013.01); *Y02T 10/70* (2013.01); *Y02T 10/7005* (2013.01); *Y02T 10/7044* (2013.01); *Y02T 10/7055* (2013.01); *Y02T 10/7061* (2013.01); *Y02T 10/7077* (2013.01); *Y02T 10/72* (2013.01); *Y02T 10/7275* (2013.01)

(58) Field of Classification Search
USPC ........................................................ 320/118
See application file for complete search history.

(56) References Cited

U.S. PATENT DOCUMENTS

| | | | |
|---|---|---|---|
| 2010/0134070 A1 | 6/2010 | Yun et al. | |
| 2011/0316520 A1 | 12/2011 | Kawahara et al. | |
| 2012/0161708 A1 | 6/2012 | Miura et al. | |
| 2013/0002202 A1* | 1/2013 | Kuraishi | H02J 7/0014 320/119 |
| 2013/0003061 A1 | 1/2013 | Blakemore et al. | |
| 2013/0026989 A1* | 1/2013 | Gibbs | H01M 10/441 320/116 |
| 2016/0159243 A1* | 6/2016 | Park | B60L 11/1866 320/136 |

FOREIGN PATENT DOCUMENTS

| | | |
|---|---|---|
| EP | 1 912 307 A2 | 4/2008 |
| JP | 2007-185005 | 7/2007 |
| JP | 2009-143478 | 7/2009 |
| JP | 2010-283922 | 12/2010 |
| JP | 2011-041357 | 2/2011 |
| JP | 2011-189768 | 9/2011 |

OTHER PUBLICATIONS

International Search Report (dated Nov. 20, 2013) for corresponding International App. PCT/EP2013/000570.
International Preliminary Report on Patentability (dated Jun. 18, 2015) for corresponding International App. PCT/EP2013/000570.
Japanese Official Action (dated Sep. 28, 2016) for corresponding Japanese App. 2015-559425.

* cited by examiner

METHOD FOR BALANCING THE VOLTAGE OF BATTERY CELLS

BACKGROUND AND SUMMARY

This disclosure relates to a method for balancing the voltage of multiple series-connected electrochemical cells of an electrical storage system of a hybrid electric vehicle. The method comprises the step of discharging the electrical storage system before cell balancing. The disclosure also relates to a hybrid electric vehicle comprising an electrical storage system, wherein a battery management unit of the electrical storage system is configured to discharge the electrical storage system before cell balancing. The disclosure is particularly advantageous in the field of electrical storage systems for heavy hybrid vehicles, such as trucks, buses, construction vehicles, or the like.

The electrical storage systems in electric and hybrid electric vehicles commonly comprise battery packs of multiple series-connected electrochemical cells, typically hundreds of lithium cells. However, no two cells are identical— there are always slight differences in for example capacity, state of charge, and self-discharge rate. The capacity and lifetime of the weakest cell limit the capacity and lifetime of the battery pack as a whole. In order to be able to obtain more energy and greater lifetime from the battery pack, the voltage is periodically redistributed among the cells in order to bring them all to a common state of charge. This is commonly referred to as cell balancing. One known method for balancing, cells is to discharge individual cells of the battery pack over balancing resistors inside the battery, described in e.g. US 2011/0316520.

Cell balancing is preferably performed at a low state of charge level, since a difference in cell state of charge at low state of charge levels corresponds to greater difference in the open circuit voltage of the cells.

In order to limit the temperature increase, the discharge power has to be low which in turn leads to an overall long battery cell balancing time.

There is thus a need for an improved battery balancing method removing the above mentioned disadvantage.

It is desirable to provide a method for balancing the voltage of multiple series-connected electrochemical cells of an electrical storage system of a hybrid electric vehicle method where the previously mentioned problem is at least partly avoided.

The disclosure concerns a method for balancing the voltage of multiple series-connected electrochemical cells of an electrical storage system of a hybrid electric vehicle. The method comprises discharging the electrical storage system by operating at least one large electrical machine of the vehicle at vehicle standstill until the state of charge of the electrical storage system or the cell having the lowest state of charge has reached a predetermined level, and subsequently balancing the voltage of the cells.

The disclosure further concerns a corresponding computer program, a corresponding computer program product, a corresponding computer system for implementing the method, and a corresponding hybrid electric vehicle comprising an electrical storage system.

By discharging the electrical storage system, prior to balancing, by operating at least one large electrical machine of the vehicle, the discharge power can be kept high while avoiding the heat release that would arise within the energy storage unit if discharge of the electrical storage system would be performed by means of internal balancing resistors. This leads to considerably shorter discharge times, such that the overall battery cell balancing time can be reduced.

The at least one large electrical machine may have a maximal output power of more than 1 kW, preferably more than 5 kW, and still more preferably more than 20 kW. The more power consuming electrical machine that is used for the discharge, the higher discharge power is obtained, and thus increased discharge rate.

The at least one large electrical machine may be an electrical traction machine or the main electrical generator of the hybrid electric vehicle. These electrical machines normally represent the most powerful electrical machines on a hybrid electric vehicle, and consequently have the potential to enable the fastest discharge rate of the electrical storage system when operated. The at least one large electrical machine may alternatively be any of an electric machine driving a vehicle and/or cargo air conditioning system, an electrical, machine driving an air compressor unit, an electrical machine driving a cooling fan, or an electrical machine driving a hydraulic pump of a hydraulic system. These electrical machines are normally less powerful than the electrical traction machine or the main electrical generator of the hybrid electric vehicle, but have instead the advantage of enabling accumulation of the discharged electrical energy. Accumulation, i.e. recuperation, of the discharged electrical energy from the electrical storage system may for example be realised by lowering/increasing the temperature of the cargo compartment a driving cabin, or charging the air storage container with compressed air, or charging a hydraulic accumulator. In this way, energy that would otherwise be wasted can come to use and replace energy that otherwise would have had to be generated.

Discharge of the electrical storage system (ESS) may be realised by setting a combustion engine of the hybrid electric vehicle in a non-combustion mode and rotating a crankshaft of the combustion engine by means of the electrical traction machine or the main electrical generator, depending on the powertrain layout of the hybrid electric vehicle. The electrical traction machine or the main electrical generator are nearly always the largest electrical machines in a hybrid electric vehicle, and using any of them for driving the crankshaft of the combustion engine in a non-combustion mode, i.e. cranking, is one of the most power requiring activities in a vehicle. Thus a high discharge rate of the electrical storage system can be obtained. The method may additionally comprise actuating an exhaust brake and/or an engine compression brake for increasing the torque required to rotate the crankshaft and thereby increasing the discharge rate of the electrical storage system.

The electrical storage system may comprise a cooling system that is operated during the discharge of the electrical storage system. A high discharge rate generally results in high beat generation from the electrical storage system. In many vehicles, the cooling system of the electrical storage system is operated by a separate electrical motor driving a pump for circulating a heat conducting liquid, such as water. Alternatively, the pump may be mechanically powered via the crankshaft when the engine turning. With active control of the temperature of the electrical storage system, the electrical storage system can be discharged much faster than with previously known methods without risking possibly harmful temperature increases in the electrical storage system.

The predetermined state of charge, at which the discharge should be ended, may be considered reached when the state of charge of the electrical storage system is less than 50%, preferably less than 40%, and still more preferably less than 35%. The aim of the discharge to a low SOC is to attain a larger variation in open circuit voltage (OCV) of each cell, thereby enabling increased accuracy in individual cell SOC determination. The cell OCV/SOC characteristic varies depending on the type of battery cell, and the OCV/SOC curve is relatively flat in a central region, and exhibits a larger inclination (dOCV/dSOC) at the end regions, i.e. at a large SOC and a low SOC.

The predetermined state of charge may be considered reached when the state of charge of the cell having the lowest state of charge is less than 30%, preferably less than 25%, and still more preferably less than 20%. The SOC of the ESS is generally estimated using coulomb counting in combination with periodical calibration. ESS SOC estimation may also be based on ESS open circuit voltage. As a consequence, an ESS having a relatively large unbalance between the individual cells of the ESS may according to this ESS SOC determination method become over discharged and thus permanently damaged even if the estimated ESS SOC is within an acceptable SOC interval. A predetermined cell low voltage threshold may thus advantageously be implemented, and discharge of the ESS for attaining a low SOC should be limited to prevent any cell from reaching a SOC below the low voltage threshold.

The predetermined state of charge may be considered reached when the derivative of the present electrical storage system output voltage with respect to the present electrical storage system state of charge dOCV/dSOC is more than two times higher than a minimum derivative of the electrical storage system output voltage with respect to the electrical storage system state of charge, preferably more than three times higher than said minimum derivative, and still more preferably more than four times higher than said minimum derivative. The dOCV/dSOC curve that describes the electrical storage system output voltage as a function of its state of charge is relatively flat, i.e. the derivative is very small, for an intermediate interval of state of charge. But below a certain state of charge level, the curve generally becomes steeper and steeper. Comparing the present derivative to the minimum derivative can thus provide an indication of the present state of charge level and thus also an indication when a sufficiently low SOC has been reached.

The predetermined state of charge may be considered reached when the derivative of the present output voltage of the cell having the lowest output voltage with respect to the present state of charge of said cell is more than five times higher than a minimum derivative of the output voltage of said cell with respect to the state of charge of said cell, preferably more than seven times higher than said minimum derivative, and still more preferably more than ten times higher than said minimum derivative. The dOCV/dSOC curve that describes the cell output voltage with respect to its state of charge is similar to that of the electrical storage system described in the previous paragraph. Also for the cell, the derivative of its output voltage with respect to its state of charge can give an indication of the present state of charge level of the cell.

The method may further comprise discharging the electrical storage system by simultaneously operating at least one additional electrical consumer of the vehicle, wherein the additional electrical consumer is any of an electrical heating radiator or an electrical power resistor system configured as a current sink. The additional electrical consumer contributes to increasing the discharge rate of the electrical storage system.

The method may also comprise simultaneously discharging of the electrical storage system by redistribution of electrical charge to another electrical storage system. This is also a way of recuperating the discharged electrical energy.

The method may also comprise the initial step of checking if the state of charge of the electrical storage system or the cell having the lowest state of charge is equal to or below a predetermined level, and omitting the step of discharging the electrical storage system by operating at least one large electrical machine of the vehicle if the state of charge of the electrical storage system or the cell having the lowest state of charge is equal to or below the predetermined level. If the state of charge of the electrical storage system or the cell having the lowest state of charge is equal to or below a predetermined level, there is no need for discharging the electrical storage system prior to balancing.

The hybrid electric vehicle may comprise an electrical traction machine or electrical generator having a maximal power output of more than 100 kW, preferably more than 150 kW. The hybrid electric vehicle may also have a weight of more than 8 tonnes, and preferably more than 16 tonnes. Heavy hybrid electric vehicles usually comprise high power electric components where the power variations are big and fast and the space for components is small. Therefore, these vehicles have a particular need for cell balancing.

The electrical storage system may comprise at least 100 series-connected battery cells, and preferably at least 150 series-connected cells. Many series-connected cells can store and deliver more energy that few series-connected cells. But with a greater number of cells connected in series, the more important is the cell balancing. If one weak cell prematurely runs out of charge cycles due to overcharging or excessive discharging, the entire pack of series-connected cells will have to be repaired or replaced.

BRIEF DESCRIPTION OF DRAWINGS

In the detailed description of the disclosure given below reference is made to the following figures, which.

DETAILED DESCRIPTION

Various aspects of the disclosure will hereinafter be described in conjunction with the appended drawings to illustrate and not to limit the disclosure. Like designations denote like elements, and variations of the described aspects are not restricted to the specifically shown embodiments, but are applicable on other variations of the disclosure.

Figure 1:
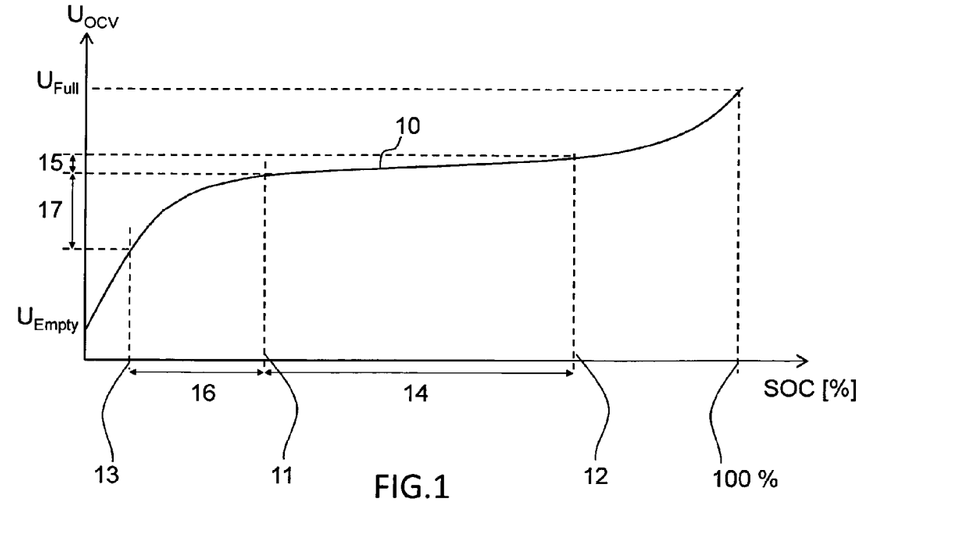
FIG. 1 shows a graph of the open circuit output voltage as a function of the state of charge of a typical electrochemical cell.

FIG. 1 shows a graph of the output open circuit voltage OCV as a function of the chemical state of charge SOC of a typical electrochemical cell, which graph is also commonly referred to as "voltage discharge curve". The electrochemical cell may preferably be a lithium cell. The electrical storage system may comprise at least 100 series-connected electrochemical cells and preferably at least 150 series-connected cells, for example lithium cells. The electrical storage system may also be referred to as a battery pack and the output voltage of the electrical storage system equals the accumulated output voltage of each cell of a common string. A battery pack may of course comprise two or more parallel-connected strings of series-connected cells, where each string comprises about 100-200 cells, for the purpose of increasing the total electrical capacity of the electrical storage system.

State of charge (SOC) is normally stated in percentage (%), where 0% corresponds to the electrochemical cell or the electrical storage system containing no charge at all and 100% corresponds to a cell or ESS being, completely full of charge. If present and maximal charge levels of the battery are known, the SOC may be calculated by: SOC=(Qmax−Qre)/Qmax, where Qmax represents maximal electrical charge and Qpre represents present electrical charge.

The solution according to the disclosure uses both cell SOC and electrical storage system SOC as alternative parameters for determining when the electrical storage system has been sufficiently discharged and cell balancing may be started.

Cell SOC is a central parameter at least during cell balancing. One common method for determining cell SOC is by measuring OCV of the cell. The OCV of a cell is determined by measuring the output voltage of the cell when the cell is disconnected from any external load and no external electric current flows through the cell. The OCV is in direct correlation with the SOC of the cell. Cell OCV is however disturbed by charging and discharging, and the cell needs to rest for a certain time period, normally several hours, to attain equilibrium where the measured OCV represents the true SOC of the cell. This fact makes cell OCV less useful for determining SOC of the electrical storage system during use of the cell, which use may involve frequent charge and discharge periods during driving of for example a hybrid electric bus in a city.

The discharge and balancing process according to the disclosure may advantageously be initiated first after the electrical storage system has rested a certain time period and the OCV of each cell have been registered. Electrical storage system SOC, as well as cell SOC, may be estimated using coulomb counting during charging, and discharging. Furthermore, the estimated electrical storage system SOC may additionally be periodically calibrated in form of fully charged battery pack for the purpose of correcting estimation errors due to long-term drift etc.

Balancing the series-connected cells of an electrical storage system involves bringing all the cells to a common state of charge. Each battery cell of a battery pack exhibits a different chemical composition, different current temperature, different internal impedance and different maximal electrical charge level. Therefore, each cell will have a unique voltage discharge curve. This fact makes cell SOC balancing necessary when connecting a plurality of cells in series.

It is a stated goal of battery design to provide an OCV as constant as possible for a large interval of state of charge. For this reason, the discharge curve 10 in FIG. 1 is almost flat, i.e. the derivative dOCV/dSOC is very small, for the intermediate interval 14 between a first state of charge level 11 and a second state of charge level 12. In the intermediate state of charge interval 14, a change in state of charge level corresponds to a very small, sometimes hardly measurable, change in cell output voltage 15. Such a low measurement resolution of the state of charge renders accurate cell balancing difficult. Before starting the balancing procedure it is therefore a good idea to lower the ESS SOC to fall within a balancing interval 16 positioned below the first state of charge level 11 but without permitting any cell to have a SOC below a third state of charge level 13, as this likely will result in the electrochemical cell being permanently weakened or damaged. In said balancing interval 16, the curve 10 is considerably steeper resulting in a larger output voltage interval 17, i.e. the derivative is considerably higher, which means that even a small difference in cell state of charge provides a measurable difference in output voltage. This leads to a better measurement resolution of the cell state of charge, and thus to easier comparison of the state of charge levels between the individual cells of the electrical storage system during the cell balancing process.

Largely depending on the composition and technology of the cell, UFUll of a cell may typically correspond to about 4.5 volt and 100% SOC, UEmpty may correspond to about 3.0 volt and 0% SOC. The shape of the discharge curve is different for each type of cell technology. The shape is also influenced by cell aging, etc. The discharge curve shape illustrated in FIG. 1 is thus only an example out of many. The SOC level corresponding to the first state of charge level 11, the second state of charge level 12 and the third state of charge level 13 may thus vary to a certain extent between different types of cell technologies and aging.

The electrical storage system generally exhibits the same voltage discharge curve as the individual cells, of which the electrical storage system is composed, under the condition that the cells are not too unbalanced. The voltage curve of FIG. 1 may thus also be used for illustrating the electrical storage system threshold SOC level that forms the predetermined trigger level for stopping discharge and initiating cell balancing, according, to the disclosure.

When the electrical storage system SOC reaches the predetermined first state of charge level 11 this defines the trigger point for starting the cell balancing process. For the electrical storage system, suitable predetermined values for the first state of charge level 11 may be 50%, more preferably 40% and still more preferably 35%. Correspondingly, when the cell having the lowest SOC reaches the predetermined third state of charge level 13 this defines the trigger point for starting the cell balancing process. For the cell having the lowest state of charge, suitable predetermined values for the third state of charge level 13 may be 30%, more preferably 25% and still more preferably 20%. This means that the cell in the stack having the lowest SOC is not allowed to decrease below these levels. This alternative method for determining SOC of the electrical storage system may be advantageous when the ESS exhibits an extremely large unbalance, such that the cell having the lowest SOC may be discharged to SOC level below for example 30% while the ESS SOC still is above 35%.

The predetermined SOC level that triggers stop of the discharge phase and start of the balancing phase may alternatively be defined in terms of the (present) derivative of the output voltage with respect to the state of charge either for the electrical storage system or for the cell having the lowest output voltage. For the electrical storage system, the predetermined level may suitably be defined as the state of charge level at which said derivative is two times higher than a minimum derivative of the curve 10, more preferably three times higher than said minimum derivative, and still more preferably four times higher than said minimum derivative. Concerning the cell having the lowest output voltage, the predetermined level may suitably be defined as the state of charge level at which said derivative is five times higher than a minimum derivative of the curve 10, more preferably seven times higher than said minimum derivative, and still more preferably ten times higher than said minimum derivative. The minimum derivative may for example be stored as a reference value from the battery manufacturer, and/or it may be determined during initial charging of the cell, and/or it may be continuously monitored and calibrated during the life time of the cell. The present derivative of the output voltage with respect to the state of charge may be calculated using coulomb counting and knowledge of the shape of the discharge curve. The present derivative may alternatively, or in combination, be calculated based on estimated difference in SOC and measured difference in OCV at two adjacent charging levels.

Figure 2:
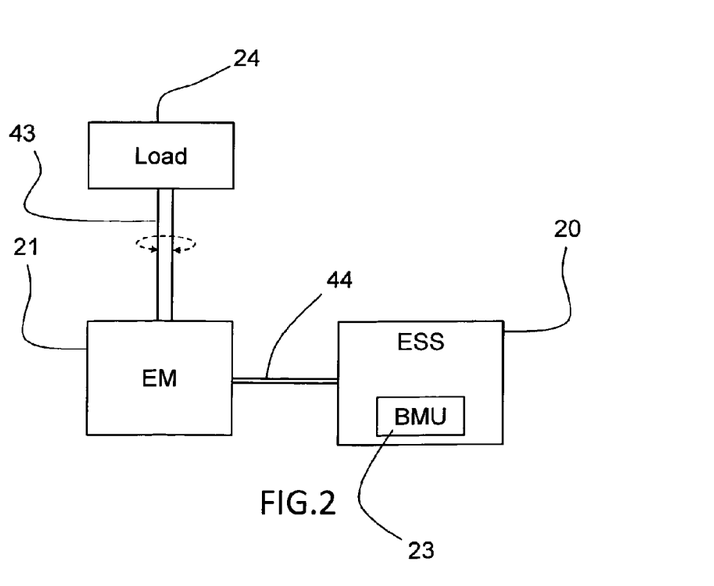
FIG. 2 shows a schematic layout of a basic system according to the disclosure.

FIG. 2 shows a very schematic layout of a basic system according to the disclosure. According to the disclosure, if it is decided, for example by a battery management unit 23 of the electrical storage system 20, to perform battery cell balancing, and if the SOC of the electrical storage system is higher than the first state of charge level 11, the state of charge is lowered to first state of charge level 11 by means of discharging the electrical storage system 20. Discharging is realised by operating at least one lane electrical machine 21 of the vehicle, in which the electrical storage system is situated, at standstill. Both discharge of the electrical storage system and cell balancing may be controlled by a battery management unit (EMU) 23 of the electrical storage system 20. However, discharge of the electrical storage system may alternatively be controlled by another electronic control unit in cooperation with the BMU 23.

The electrical machine 21 being large means that it is capable of driving a large load 24, i.e. a load requiring a relatively large output torque, such as but not limited to, rotation of the crankshaft of the combustion engine or hydraulic oil pumps in an extensive hydraulic system, such as in a construction vehicle. Disqualified as large loads 24 are for example motors for adjusting the rear view mirrors or motors for opening and closing the windows of the vehicles. Suitably, said electrical machine 21 may have a maximal power output of more than 1 kW, preferably more than 5 kW and more preferably more than 20 kW. The electrical machine 21 could for example be the electrical traction machine or the main electrical generator of the hybrid electric vehicle. Alternatively, if the vehicle for example comprises a refrigerated cargo compartment, the electrical machine 21 may drive a cargo air conditioning system. In particular buses, but also other heavy vehicles, are usually supplied with an extensive compressed air system used for air suspension, door actuation, braking, etc. In a bus, the electrical machine 21 may be used for driving an air compressor. The electrical machine 21, applicable not only to trucks or buses but to a wide range of vehicles, may alternatively be used for driving a cooling fan of the combustion engine radiator. The electric machine 21 may also be used for driving a hydraulic pump of a hydraulic system. The vehicle may for example be a construction vehicle having a hydraulically operated implement, and the valve system may typically be set to allow a circulating flow of hydraulic fluid, as well as at least one restriction for increasing the flow resistance. The hydraulic pump may also be used for charging a hydraulic accumulator of the hydraulic system, such that the energy may be recuperated and not wasted. Correspondingly, an electrical machine 21 may be used for charging a mechanical energy storage system, such as a flywheel storage system. Obviously, two or more electrical machines 21 may be used simultaneously for discharging the electrical storage system 20 (non-showed).

Figure 3:
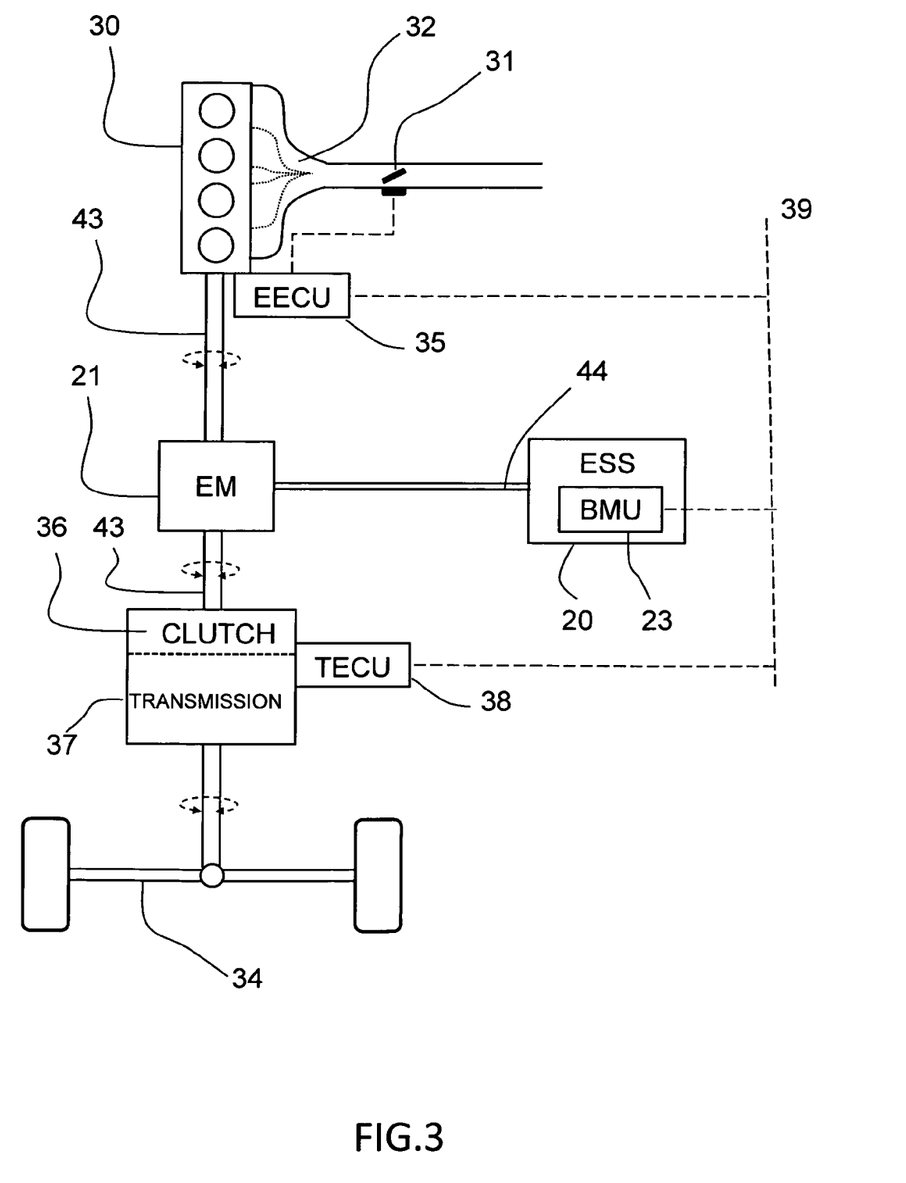
FIG. 3 shows a schematic layout of a development of the system in FIG. 2.

FIG. 3 shows a schematic layout of a preferred embodiment of the disclosure, in which the discharge of the electrical storage system is realised by setting a combustion engine 30 of the hybrid electric vehicle in a non-combustion mode and rotating a crankshaft of the combustion engine by means of the electrical traction machine. In a non-combustion mode, there is no fuel injection into the combustion engine 30. The large electrical machine is here thus formed by the electrical traction machine of a parallel hybrid electric vehicle. Clearly, if the hybrid electric vehicle had a serial propulsion layout, with no mechanical connection between the combustion engine and driving wheels, the large electrical machine would be formed of the electrical generator connected to the combustion engine (non-showed embodiment). The discharge rate of the electrical storage system 20 may be further increased by increasing the torque required to rotate the crankshaft. This can be done by for example actuating an engine compression brake and/or an exhaust brake 31 situated in the exhaust path 32 of the vehicle. The exhaust brake 31 at least partly closes off the exhaust pipe causing the exhaust gases upstream the exhaust brake 31 to be compressed, which results in increased resistance for the pistons to evacuate the air within the cylinders, such that the crankshaft is slowed down. During the discharge, no fuel is injected into the combustion engine 30 and consequently the flow within the exhaust path 32 generated by the pumping action of the pistons is constituted by air. The compression brake 32 operates in a similar manner as the exhaust brake 31 but restricts flow out of the cylinders by means of the engine variable timing cam-controlled exhaust valves instead. The exhaust brake 31 or engine compression brake 32 are suitably controlled by an engine electronic control unit 35.

During the discharge, the driveshaft 34 downstream the transmission 37 is disconnected from the crankshaft of the combustion engine 30, for example by means of a clutch 36 positioned between the electrical machine 21 and driveshaft 34. Hence, no torque is transmitted to the driveshaft 34 and the vehicle consequently stands still.

Battery management unit 23, transmission electronic control unit 38 and engine electronic control unit 35 may be interconnected by a communication-bus 39, such as a CAN-bus or the like.

Figure 4:
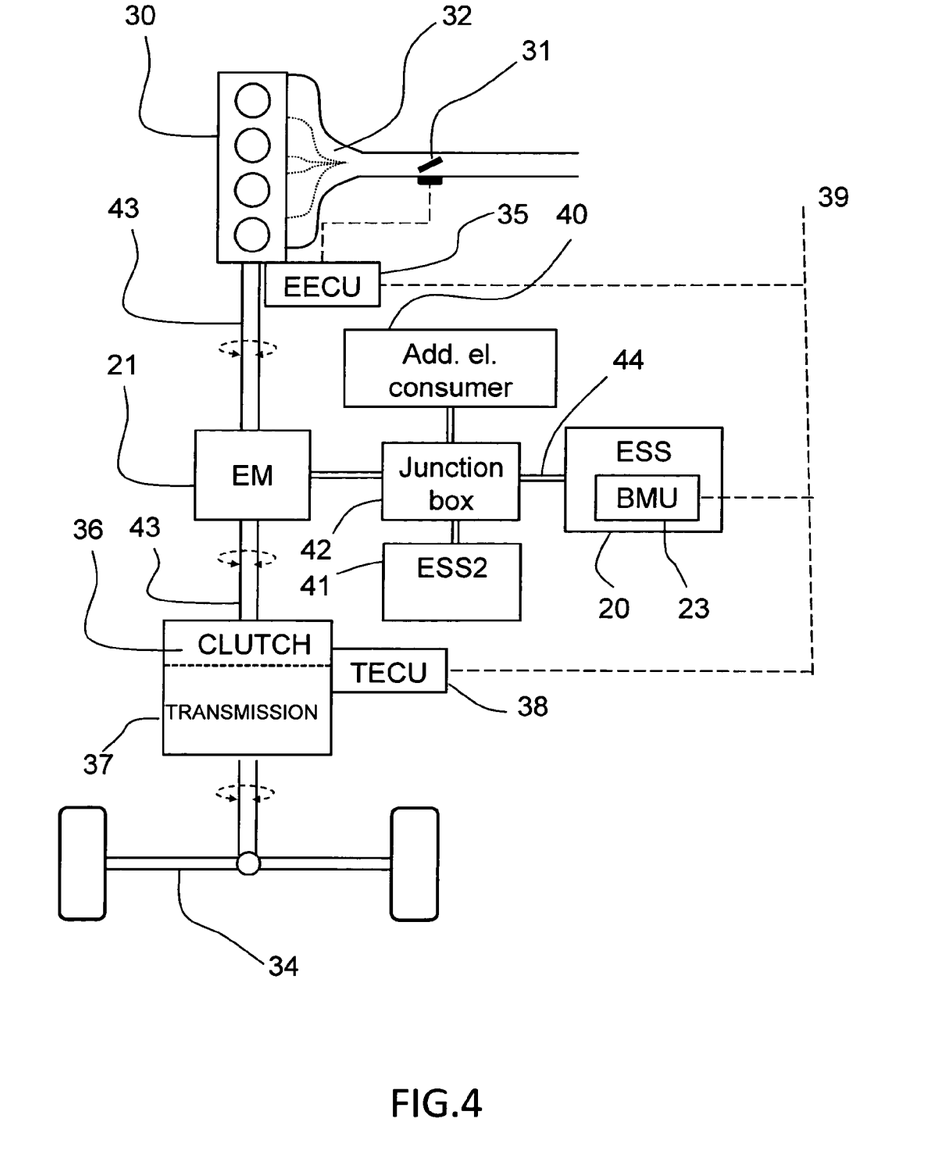
FIG. 4 shows a schematic layout of further a development of the system in FIG. 2.

FIG. 4 shows a schematic layout of a further development of the disclosure, in which discharging of the electrical storage system 20 may be realised by simultaneous operation at least one additional electrical consumer 40 of the vehicle and/or by charging an additional electrical storage system 41. The at least one additional electrical consumer 40, as well as charging of the additional electrical storage system 41, may contribute to increased discharge rate by simultaneous operation in combination with the at least one electrical machine 21. The at least one additional electrical consumer 40 may for example be formed by an electrical heating radiator or an electrical power resistor system configured as a current sink converting electrical energy to heat. An electric junction box 42 comprising power electronic equipment may be used as switch for allowing discharge of the electrical storage system 20 to be efficiently and energy-saving realised.

In FIGS. 2-4, the electrical machine 21 is connected to the load 24, 30 and transmission 37 by a rotatable shaft 43 capable of transmitting torque, but the electric machine 21 may alternative by integrated, with the load and/or transmission 37, such that interconnecting shafts 43 becomes superfluous. The electrical connection 44 between the electrical storage system 20, electrical machine 21 and junction box 42 may for example be formed by DC, single phase AC or three phase AC.

The electrical storage system 20 advantageously comprises a cooling system, such as water cooling that may be operated during the discharge of the electrical storage system 20.

Figure 5:
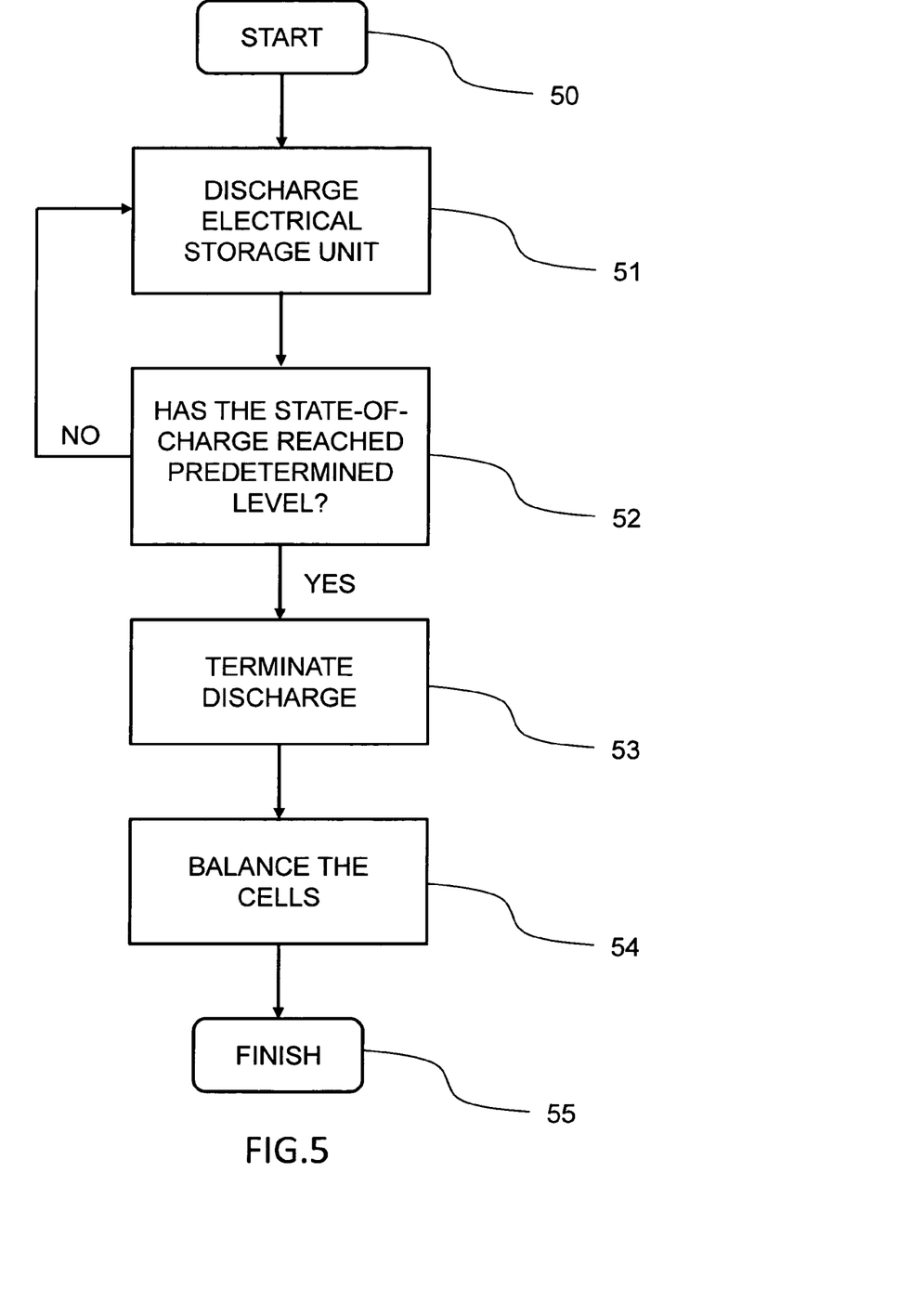
FIG. 5 shows an exemplary flow chart for carrying out the method according to the disclosure.

FIG. 5 shows an exemplary flow chart for carrying out a cell balancing procedure according to the method of the disclosure. The procedure may be controlled by the battery management unit 23, and takes its start 50 at vehicle standstill. The first step 51 comprises discharging the electrical storage system 20. As a second step 52, the battery management unit 23 checks if the state of charge of either the electrical storage system 20 or the cell having the lowest state of charge has reached a predetermined level. If the answer is "no", the procedure returns to the first step 51 of discharging the electrical storage system 20. If the answer however is "yes", the procedure enters a third step 53 where the discharge of the electric storage unit is terminated. When the discharge has been terminated, the process enters a fourth step 54 during which the voltage balancing of the multiple series-connected electrochemical cells of the electrical storage system 20 is carried out. The cell balancing aims at bringing all the individual cells to a common state of charge level, and can be performed according to various known techniques. The cell balancing may be managed by a battery management unit 23 situated inside the electrical storage system 20.

The exemplary flow chart for carrying out a cell balancing procedure described in FIG. 5 may further include the initial step of checking, before starting the discharge of the ESS, if the state of charge of the electrical storage system or the cell having the lowest state of charge is equal to or below a predetermined level. If it is determined that the state of charge of the electrical storage system or the cell having the lowest state of charge is equal to or below the predetermined level, then the step of discharging the electrical storage system by operating at least one large electrical machine is omitted and balancing may be initiated directly, because a sufficiently low SOC is already present.

Reference signs mentioned in the claims should not be seen as limiting the extent of the matter protected by the claims, and their sole function is to make claims easier to understand.

As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. A method for balancing the voltage of multiple series-connected electrochemical cells of an electrical storage system of a hybrid electric vehicle comprising discharging the electrical storage system by operating at least one electrical machine of the vehicle at vehicle standstill until the state of charge of the electrical storage system or the cell having, the lowest state of charge has reached a predetermined level, and subsequently balancing the voltage of the cells.

2. The method according to claim 1, wherein the at least one electrical machine has a maximal power output of more than 1 kW.

3. The method according to claim 1, wherein the at least one electrical machine is the electrical traction machine or the main electrical generator of the hybrid electric vehicle.

4. The method according to claim 3, wherein the hybrid electric vehicle comprises a combustion engine having a crankshaft, and discharge of the electrical storage system is realized by setting the combustion engine in a non-combustion mode and rotating the crankshaft of the combustion engine by means of the electrical traction machine or the main electrical generator.

5. The method according to claim 4, wherein the hybrid electric vehicle comprises an exhaust brake and/or an engine compression brake, the method comprising actuating the exhaust brake and/or the engine compression brake for increasing the torque required to rotate the crankshaft and thereby increasing the discharge rate of the electrical storage system.

6. The method according to claim 1, wherein the at least one electrical machine is any of an electric machine driving a vehicle and/or cargo air conditioning system, an electrical machine driving an air compressor unit, an electrical machine driving a cooling fan, or an electrical machine driving a hydraulic pump of a hydraulic system.

7. The method according to claim 1, wherein the electrical storage system comprises a cooling system and the cooling system is operated during the discharge of the electrical storage system.

8. The method according to claim 1, wherein the predetermined state of charge has been reached when the state of charge of the electrical storage system is less than 50%.

9. The method according to claim 1, wherein the predetermined state of charge has been reached when the state of charge of the cell having the lowest state of charge is 30%.

10. The method according to claim 1, wherein the predetermined state of charge has been reached when the derivative of the present electrical storage system output voltage with respect to the present electrical storage system state of charge is more than two times higher than a minimum derivative of the electrical storage system output voltage with respect to the electrical storage system state of charge.

11. The method according to claim 1, wherein the predetermined state of charge has been reached when the derivative of the present output voltage of the cell having the lowest output voltage with respect to the present state of charge of the cell is more than five times higher than a minimum derivative of the output voltage of the cell with respect to the state of charge of the cell.

12. The method according to claim 1, comprising discharging the electrical storage system by simultaneously operating at least one additional electrical consumer of the vehicle, wherein the additional electrical consumer is an electrical heating radiator or an electrical power resistor system configured as a current sink.

13. The method according to claim 1 comprising discharging the electrical storage system by simultaneously charging another electrical storage system.

14. The method according to claim 1, comprising the initial step of checking if the state of charge of the electrical storage system or the cell having the lowest state of charge is equal to or below a predetermined level, and omitting the step of discharging the electrical storage system by operating at least one electrical machine of the vehicle if the state of charge of the electrical storage system or the cell having the lowest state of charge is equal to or below the predetermined level.

15. The method according to claim 1, wherein the hybrid electric vehicle comprises an electrical traction machine having a maximal power output of more than 100 kW.

16. The method according to claim 1, wherein the hybrid electric vehicle has a weight of more than 8 tons.

17. The method according to claim 1, wherein the electrical storage system comprises at least 100 series-connected cells.

18. The method according to claim 1, wherein the electrical storage system comprises two or ore parallel-connected strings of series-connected cells.

19. A computer comprising a program for performing all the steps of a method for balancing the voltage of multiple series-connected electrochemical cells of an electrical storage system of a hybrid electric vehicle comprising discharging the electrical storage system by operating at least one electrical machine of the vehicle at vehicle standstill until the state of charge of the electrical storage system or the cell having the lowest state of charge has reached a predetermined level, and subsequently balancing the voltage of the cells when program is run on the computer.

20. A computer program product comprising a program stored on a non-transitory computer readable medium for performing all the steps of a method for balancing the voltage of multiple series-connected electrochemical cells of an electrical storage system of a hybrid electric vehicle comprising discharging the electrical storage system by operating at least one electrical machine of the vehicle at vehicle standstill until the state of charge of the electrical storage system or the cell having the lowest state of charge has reached a predetermined level, and subsequently balancing the voltage of the cells when the program is run on a computer.

21. A computer system for implementing a method for balancing the voltage of multiple series-connected electrochemical cells of an electrical storage system of a hybrid electric vehicle, the method comprising discharging the electrical storage system by operating at least one electrical machine of the vehicle at vehicle standstill until the state of charge of the electrical storage system or the cell having the lowest state of charge has reached a predetermined level, and subsequently balancing the voltage of the cells.

22. A hybrid electric vehicle comprising an electrical storage system comprising multiple series-connected electrochemical cells and a battery management unit (23), wherein the battery management unit is configured to balance the voltage of the multiple series-connected electrochemical cells of the electrical storage system wherein the battery management unit is configured to discharge the electrical storage system by operating at least one electrical machine of the vehicle at vehicle standstill until the state of charge of the electrical storage system or the cell having the lowest state of charge has reached a predetermined level, and subsequently to balance the voltage of the cells.

23. The hybrid electric vehicle according to claim 22, wherein the electrical storage system comprises two or more parallel-connected strings of series-connected cells.

* * * * *